United States Patent [19]
Yokoyama et al.

[11] Patent Number: 5,700,069
[45] Date of Patent: Dec. 23, 1997

[54] ANTI-SKID CONTROL SYSTEM FOR AN AUTOMOTIVE VEHICLE

[75] Inventors: Satoshi Yokoyama, Anjo; Shinsuke Sakane, Toyota; Masaru Kamikado, Kariya, all of Japan

[73] Assignee: Aisin Seiki Kabushiki Kaisha, Kariya, Japan

[21] Appl. No.: 676,836

[22] Filed: Jul. 8, 1996

[30] Foreign Application Priority Data

Jul. 6, 1995 [JP] Japan ..................... 7-171033

[51] Int. Cl.$^6$ ..................... B60T 8/32
[52] U.S. Cl. ..................... 303/115.2; 303/115.4; 303/116.1
[58] Field of Search ..................... 303/115.1–115.5, 303/116.1, 116.2, 20, 119.1

[56] References Cited

U.S. PATENT DOCUMENTS

| | | | |
|---|---|---|---|
| 5,368,374 | 11/1994 | Fujimoto | 303/116.1 |
| 5,494,345 | 2/1996 | Inagaki et al. | 303/20 |
| 5,501,514 | 3/1996 | Resch et al. | 303/115.4 |
| 5,522,650 | 6/1996 | Negrin et al. | 303/116.1 |
| 5,531,514 | 7/1996 | Hishii et al. | 303/116.1 |
| 5,620,238 | 4/1997 | Takeuchi | 303/116.1 |

FOREIGN PATENT DOCUMENTS 62-134361  6/1987  Japan .

*Primary Examiner*—Robert J. Oberleitner
*Assistant Examiner*—Chris Schwartz
*Attorney, Agent, or Firm*—Sughrue, Mion, Zinn, Macpeak & Seas, PLLC

[57] ABSTRACT

The present invention is directed to an anti-skid control system which includes a pressure generator to supply a hydraulic braking pressure into a wheel brake cylinder through an actuator. A return passage is provided for communicating the wheel brake cylinder with the actuator. A pressure pump is disposed in the return passage, and a reservoir is disposed in the return passage at the inlet port's side of the pump. The reservoir stores the brake fluid discharged from the wheel brake cylinder through the actuator to decrease the wheel cylinder pressure. The actuator blocks the communication between the pressure generator and the wheel brake cylinder, and then the pump discharges the brake fluid stored in the reservoir into the return passage thereby to gradually increase the wheel cylinder pressure. A first fluid estimating device estimates a first amount of brake fluid supplied from the pressure generator into a hydraulic circuit disposed downstream of the actuator and including the wheel brake cylinder and the reservoir. And, a fluid supply allowing device allows the actuator to communicate the pressure generator with the wheel brake cylinder, when the first amount of brake fluid is smaller than a first predetermined amount.

9 Claims, 9 Drawing Sheets

ANTI-SKID CONTROL SYSTEM FOR AN AUTOMOTIVE VEHICLE

BACKGROUND OF THE INVENTION

1. Field of the Invention

The present invention relates to an anti-skid control system for controlling the braking force applied to road wheels in a braking operation of an automotive vehicle to prevent the road wheels from being locked, and more particularly to an anti-skid control system which has a reservoir and a pressure pump disposed in a return passage for bypassing a pressure control apparatus, and wherein a pressure in a wheel brake cylinder is decreased by discharging the brake fluid therein into the reservoir, and the pressure is gradually increased by the pressure pump which returns the brake fluid into the wheel brake cylinder.

2. Description of the Related Arts

Various anti-skid control systems are known, including a system which is disclosed in Japanese Patent Laid-open publication No.62-134361, and in which a pressure in a wheel brake cylinder is decreased by discharging the brake fluid therein into a reservoir, and the brake fluid stored in the reservoir is returned to the wheel brake cylinder by a pressure pump. According to this publication, a return passage is connected to a hydraulic brake circuit between a braking pressure modulator and a wheel brake (i.e., wheel brake cylinder), thereby to reduce an impact applied to the brake pedal.

According to the above-identified Japanese publication No.62-134361, it is described that a controller 10 changes a braking pressure modulating valve 4 to be placed into a normal braking position for generating the braking pressure, when the locking of the wheel has not been caused for a predetermined period of time after a return pump 9 was activated so as to return the brake fluid from a tank 8 (i.e., reservoir) to the wheel brake cylinders 6, 7. However, the predetermined period of time in determining when the valve is to be placed in the normal braking position has not been clarified. For example, if the predetermined time for activating the return pump so as to return the brake fluid from the reservoir to the wheel brake cylinder is short, the reservoir will be immediately fulfilled with the brake fluid, so that a space for decreasing the braking pressure will be lost thereby to cause the wheel to be locked. On the contrary, if the predetermined time is too long, the brake fluid in the reservoir will be lost, so that the pressure in the wheel brake cylinder can not be increased sufficiently. Therefore, it is necessary to adequately estimate the amount of brake fluid stored in the reservoir.

However, it is difficult to estimate the amount of brake fluid in the reservoir, so that sometimes the estimated amount of brake fluid may not indicate zero, while the reservoir is in fact, empty. Since it is so arranged in general that the master cylinder is connected with the wheel brake cylinders when the estimated amount of brake fluid indicates zero, increasing operation of the braking pressure will be delayed. As far as there is a room for receiving the brake fluid in the reservoir, the master cylinder may be connected with the wheel brake cylinders to supply the brake fluid thereinto, even if the reservoir is not empty.

Furthermore, if it is possible to estimate the amount of brake fluid supplied from the master cylinder into a hydraulic circuit which is disposed downstream of the braking pressure modulating valve and which includes the wheel brake cylinders and the reservoir, then that amount of brake fluid may be used for providing an upper limit of the estimated amount of brake fluid in the reservoir, since the estimated amount of brake fluid in the reservoir never exceeds the amount of brake fluid supplied from the master cylinder into the downstream hydraulic circuit.

SUMMARY OF THE INVENTION

Accordingly, it is an object of the present invention to provide an anti-skid control system having an actuator disposed between a pressure generator and a wheel brake cylinder, wherein the brake fluid in the wheel brake cylinder is discharged into a reservoir to decrease the pressure in the wheel brake cylinder, and the brake fluid in the reservoir is returned by a pressure pump to the wheel brake cylinder through the actuator, and wherein the brake fluid may be supplied into a hydraulic circuit which is disposed downstream of the actuator and which includes the wheel brake cylinders and the reservoir, basically independent of the reservoir, and estimating adequately the amount of brake fluid supplied into the hydraulic circuit.

In accomplishing the above and other objects, an anti-skid control system for controlling a braking force applied to road wheels of an automotive vehicle includes a wheel brake cylinder which is operatively connected to a road wheel of the vehicle for applying a braking force thereto, a hydraulic pressure generator for supplying a pressurized brake fluid to the wheel brake cylinder. Actuating means is disposed between the hydraulic pressure generator and the wheel brake cylinder for controlling the hydraulic braking pressure in the wheel brake cylinder. Communicated with the actuating means is a reservoir which has a capacity for storing a certain amount of brake fluid, and which stores the brake fluid in the wheel brake cylinder through the actuating means to decrease the pressure in the wheel brake cylinder. A return passage is provided for communicating the reservoir with the wheel brake cylinder. There is disposed in the return passage a pressure pump, which has an inlet port communicated with the reservoir and an outlet port communicated with the wheel brake cylinder for discharging a pressurized brake fluid thereinto. The actuating means is adapted to block the communication between the hydraulic pressure generator and the wheel brake cylinder, and then the pressure pump is adapted to discharge the brake fluid stored in the reservoir into the return passage to gradually increase the pressure in the wheel brake cylinder. First fluid estimating means is provided for estimating a first amount of brake fluid which is supplied from the hydraulic pressure generator into a hydraulic circuit which is disposed downstream of the actuating means and which includes the wheel brake cylinder and the reservoir. And, fluid supply allowing means is provided for allowing the actuating means to communicate the hydraulic pressure generator with the wheel brake cylinder, when the first amount of brake fluid is smaller than a first predetermined amount.

The anti-skid control system may further include vehicle deceleration detecting means which is provided for detecting a deceleration of the vehicle, so that the first fluid estimating means estimates the first amount of brake fluid on the basis of the deceleration of the vehicle, which is detected by the vehicle deceleration detecting means when the actuating means starts controlling the hydraulic braking pressure in the wheel brake cylinder, and adds a supply amount of brake fluid, which is supplied into the wheel brake cylinder by the actuating means, to the first amount of brake fluid.

Preferably, the fluid supply allowing means is adapted to allow the actuating means to communicate the hydraulic pressure generator with the wheel brake cylinder, when a rapid increase of the hydraulic braking pressure in the wheel brake cylinder is required.

Furthermore, the anti-skid control system may include second fluid estimating means which is provided for estimating a second amount of brake fluid stored in the reservoir on the basis of the amount of brake fluid which is supplied into the reservoir and the amount of brake fluid which is discharged from the reservoir, so that the fluid supply allowing means allows the actuating means to communicate the hydraulic pressure generator with the wheel brake cylinder, when the second amount of brake fluid is smaller than a second predetermined amount.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
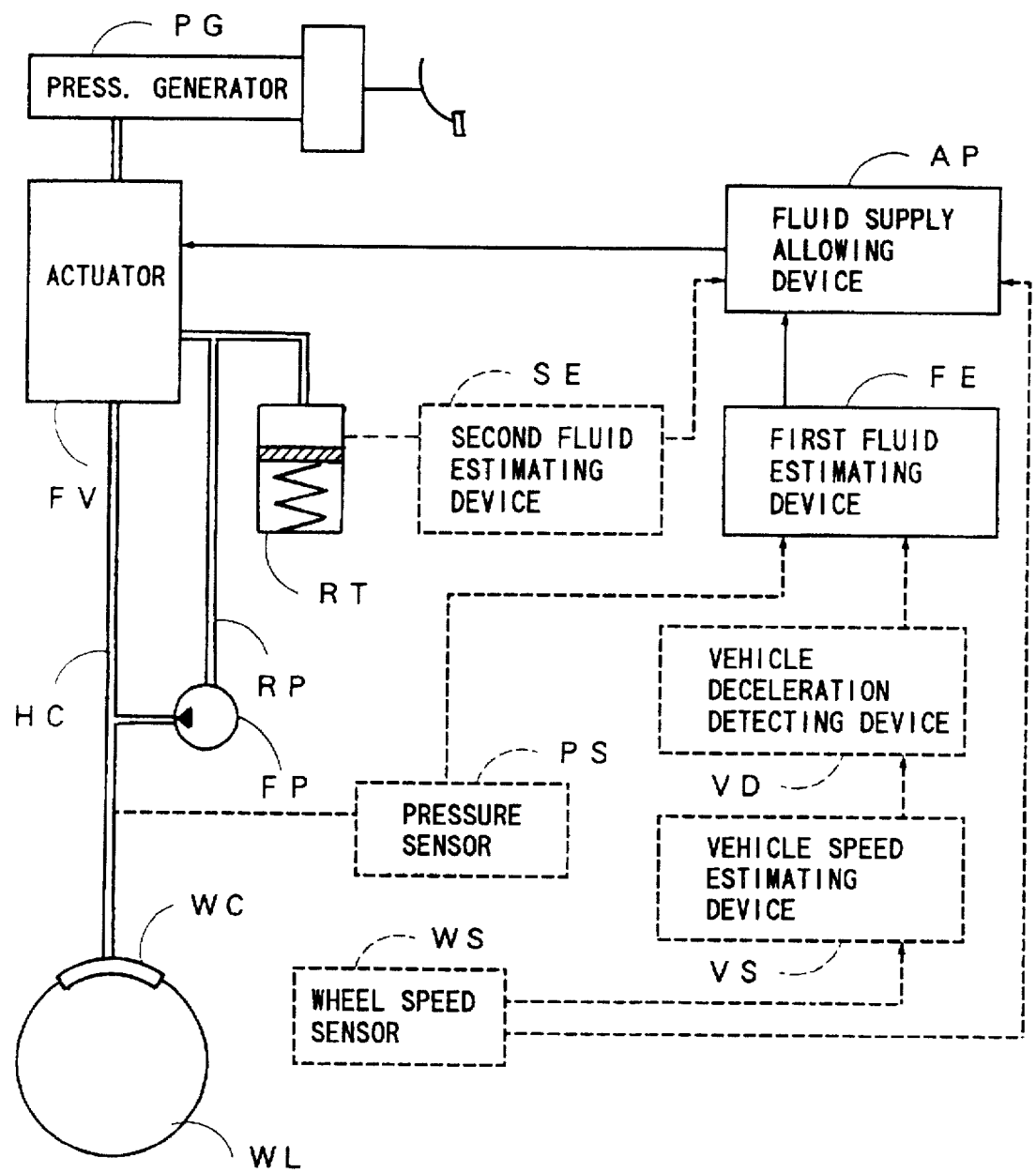
FIG. 1 is a general block diagram illustrating an anti-skid control system according to the present invention.

Referring to FIG. 1, there is schematically illustrated an anti-skid control system according to the present invention, which controls a braking force applied to a road wheel WL of a vehicle depending upon a braking condition. In this anti-skid control system, it is so arranged that when the hydraulic pressure generator PG is operated, a hydraulic braking pressure is supplied from the pressure generator PG to a wheel brake cylinder WC through an actuator FV, so that a braking force is applied to the road wheel WL. A reservoir RT is communicated with the actuator FV. This reservoir RT has a capacity for storing a certain amount of brake fluid, and stores the brake fluid in the wheel brake cylinder WC through the actuator FV to decrease the pressure in the wheel brake cylinder WC. A return passage RP is provided for communicating the reservoir RT with the wheel brake cylinder WC. And, a pressure pump FP is disposed in the return passage RP such that its inlet port is communicated with the reservoir RT, and that its outlet port is communicated with the wheel brake cylinder WC for discharging a pressurized brake fluid thereinto. It is so arranged that the actuator FV blocks the communication between the hydraulic pressure generator PG and the wheel brake cylinder WC, and then the pressure pump FP discharges the brake fluid which is stored in the reservoir RT into the return passage RP thereby to gradually increase the pressure in the wheel brake cylinder WC. A first fluid estimating device FE is provided for estimating a first amount of brake fluid which is supplied from the hydraulic pressure generator PG into a hydraulic circuit HC which is disposed downstream of the actuator FV and which includes the wheel brake cylinder WC and the reservoir RT. And, a fluid supply allowing device AP is provided for allowing the actuator FV to communicate the hydraulic pressure generator PG with the wheel brake cylinder WC, when the first amount of brake fluid is smaller than a first predetermined amount.

As indicated by a phantom line in FIG. 1, a vehicle deceleration detecting device VD may be provided for detecting a deceleration of the vehicle, so that the first fluid estimating device FE estimates the first amount of brake fluid on the basis of the deceleration of the vehicle which is detected by the vehicle deceleration detecting device VD when the actuator FV starts controlling the hydraulic braking pressure in the wheel brake cylinder WC, and that the first fluid estimating device FE adds a supply amount of brake fluid, which is supplied into the wheel brake cylinder WC by the actuator FV, to the first amount of brake fluid. A second fluid estimating device SE may be provided for estimating a second amount of brake fluid stored in the reservoir RT, on the basis of the amount of brake fluid which is supplied into the reservoir RT and the amount of brake fluid which is discharged from the reservoir RT, so that the fluid supply allowing device AP allows the actuator AP to communicate the hydraulic pressure generator PG with the wheel brake cylinder WC, when the second amount of brake fluid is smaller than a second predetermined amount. A wheel speed sensor WS may be provided for detecting a wheel speed of the road wheel WL, and a vehicle speed estimating device VS may also be provided for estimating an estimated vehicle speed on the basis of the wheel speed, so that the vehicle deceleration detection device VD differentiates the estimated vehicle speed to provide the vehicle deceleration. Instead of the the vehicle deceleration detection device VD, a pressure sensor PS may be provided for detecting the pressure in the wheel brake cylinder WC, so that the first fluid estimating device FE estimates the first amount of brake fluid on the basis of the pressure in the wheel brake cylinder WC detected by the pressure sensor PS.

Figure 2:
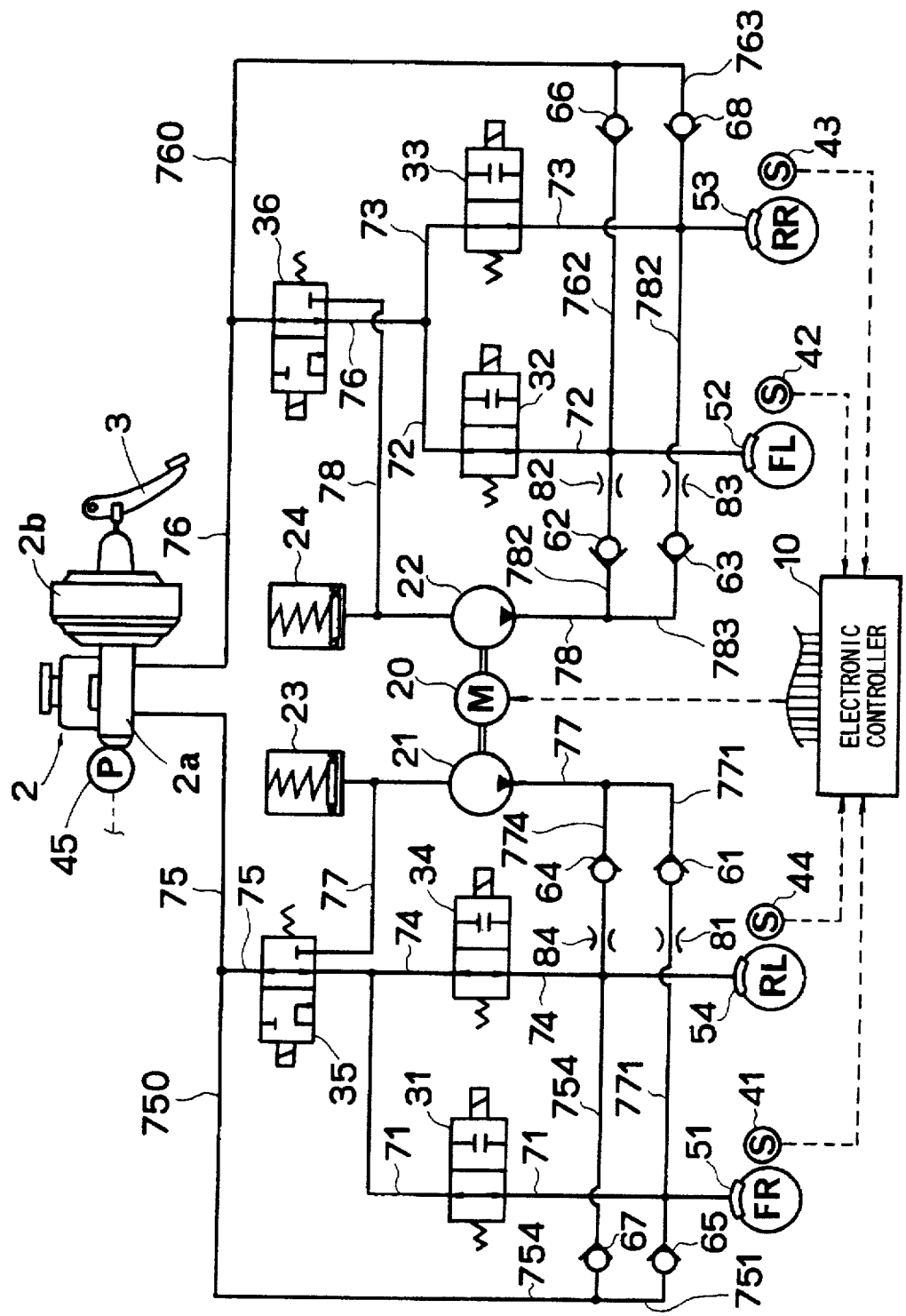
FIG. 2 is a schematic block diagram of an anti-skid control system of an embodiment of the present invention.

More specifically, an embodiment of the present invention is illustrated in FIGS. 2 to 8. Referring to FIG. 2, a hydraulic pressure generator 2 comprises a master cylinder 2a and a booster 2b operated in response to depression of a brake pedal 3. Two-port two-position solenoid operated changeover valves 31 to 34 (hereinafter, simply referred to as solenoid valves 31 to 34) are disposed in the passages 71 to 74, which are respectively connected to wheel brake cylinders 51 to 54 which are operatively connected to the road wheels FR, FL, RR and RL, respectively. A pair of three-port two-position solenoid operated changeover valves 35, 36 (hereinafter, simply referred to as solenoid valves 35, 36) are disposed in the passages 75, 76 which connect the passages 71, 74 and the passages 72, 73 to the master cylinder 2a, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, a diagonal hydraulic dual circuits system has been formed as shown in FIG. 2.

The valve 35 provided for the road wheels FR, RL has a port which is connected to the passage 71 disposed between the solenoid valve 31 and the wheel brake cylinder 51, through return passages 77 and 771, and connected to the passage 74 disposed between the solenoid valve 34 and the wheel brake cylinder 54, through return passages 77 and 774. In the return passage 77, there is disposed a pressure pump 21, an inlet port of which is connected to a reservoir 23. In the return passages 771, 774, there are disposed check valves 61, 64 for preventing the brake fluid from flowing into the pump 21, and orifices 81, 84 are disposed at the sides of the wheel brake cylinders 51, 54 with respect to the check valves 61, 64. Passages 750, 751, 754 are provided for connecting a position between the master cylinder 2a and the solenoid valve 35 to positions between the solenoid valves 31, 34 and the wheel brake cylinders 51, 54. In the passages 751, 754, there are disposed check valves 65, 67 for preventing the brake fluid from flowing into the wheel brake cylinders 51, 54.

The system for the road wheels FL, RR is constituted in the same manner as that described above. That is, the valve 36 provided for the road wheels FL, RR has a port which is connected to the passage 72 disposed between the solenoid valve 32 and the wheel brake cylinder 52, through return passages 78 and 782, and connected to the passage 73 disposed between the solenoid valve 33 and the wheel brake cylinder 53, through return passages 78 and 783. In the return passage 78, there is disposed a pressure pump 22, an inlet port of which is connected to a reservoir 24. In the return passages 782, 783, there are disposed check valves 62, 63 for preventing the brake fluid from flowing into the pump 22, and orifices 82, 83 are disposed at the sides of the wheel brake cylinders 52, 53 with respect to the check valves 62, 63. Passages 760, 762, 763 are provided for connecting a position between the master cylinder 2a and the solenoid valve 36 to positions between the solenoid valves 32, 33 and the wheel brake cylinders 52, 53. In the passages 762, 763, there are disposed check valves 66, 68 for preventing the brake fluid from flowing into the wheel brake cylinders 52, 53.

The pumps 21, 22 are driven by an electric motor 20 continuously during the anti-skid control operation, so that the brake fluid of the amount proportional to the rotational speed of the electric motor 20 is fed to each of the wheel brake cylinders 51 to 54. Each of the reservoirs 23, 24 is provided with a piston and a spring, and functions so as to store the brake fluid returned from each of the solenoid valves 35, 36 through the return passages 77, 78, so that the brake fluid is pumped up by the pumps 21, 22 and supplied to the wheel brake cylinders 51 to 54 when the solenoid valves 31 to 34 are closed, while the brake fluid is returned to the reservoirs 23, 24 when the solenoid valves 31 to 34 are open. The aforementioned check valve 61 and orifice 81, and the check valve 64 and orifice 84 are provided for dividing the brake fluid discharged from the pump 21 to flow into the wheel brake cylinders 51, 54, respectively. The check valve 62 and orifice 82, and the check valve 63 and orifice 83 are provided for dividing the brake fluid discharged from the pump 22 to flow into the wheel brake cylinders 52, 53, respectively.

Each of the solenoid valves 31 to 34 is in its first operating position as shown in FIG. 2 when a current is not fed to its solenoid coil, so that each of the wheel brake cylinders 51 to 54 is communicated with the hydraulic pressure generator 2 through the solenoid valves 35, 36 in their first operating positions. When the current is fed to each solenoid coil of the solenoid valves 31 to 34, each solenoid valve is changed over to its second operating position, so that each of the wheel brake cylinders 51 to 54 is blocked from the communication with the hydraulic pressure generator 2. Whereas, each of the solenoid valves 35, 36 is placed in its first operating position as shown in FIG. 2 when the current is not fed to its solenoid coil, so that the hydraulic pressure generator 2 is communicated with the solenoid valves 31 to 34 and the return passages 77, 78 are shut off. When the current is fed to each solenoid coil of the solenoid valves 35, 36, each solenoid valve is changed over to its second operating position, so that the solenoid valves 31 to 34 are blocked from the communication with the hydraulic pressure generator 2, but communicated with the reservoirs 23, 24 and the pumps 21, 22. The check valves 65 to 68 as shown in FIG. 2 allow the brake fluid to return from each of the wheel brake cylinders 51 to 54 to the hydraulic pressure generator 2, and blocks the counterflow of the brake fluid.

Accordingly, during the anti-skid control operation wherein the pumps 21, 22 are continuously driven, with each of the solenoid valves 31 to 36 energized or de-energized, the hydraulic braking pressure in each of the wheel brake cylinders 51 to 54 is rapidly increased, gradually increased or decreased. Namely, when the current is not fed to the solenoid coil of each of the solenoid valves 31 to 36, the pressurized brake fluid is supplied from the hydraulic pressure generator 2 directly to the wheel brake cylinders 51 to 54 to increase the hydraulic pressure therein rapidly. When the current is fed to each solenoid coil of the solenoid valves 35 and 36 (with the solenoid valves 31 to 34 de-energized), the wheel brake cylinders 51 to 54 are blocked from the communication with the hydraulic pressure generator 2, but communicated with the reservoir 23 or 24 to decrease the hydraulic pressure therein. When the current is fed to all the solenoid coils of the solenoid valves 31 to 36, the brake fluid in the reservoirs 23, 24 is pumped up by the pumps 21, 22 to be supplied to the wheel brake cylinders 51 to 54 through the check valves 61 to 64 and the orifices 81 to 84. The amount of brake fluid supplied by the pumps 21, 22 to the wheel brake cylinders 51 to 54 has been set to the amount much smaller than the amount of brake fluid supplied from the master cylinder 2a to the wheel brake cylinders 51 to 54, so that the hydraulic pressure in each of the wheel brake cylinders 51 to 54 is gradually increased. Furthermore, by adjusting the time intervals of energizing and de-energizing of the solenoid of the solenoid valves 31 to 34, with the solenoid valves 35, 36 energized, it is possible to substantially hold the hydraulic braking pressure in the wheel brake cylinders 51 to 54. Or, if the electric motor 20 is turned off when the solenoid valves 31 to 34 are energized, the hydraulic pressure in the wheel brake cylinders 51 to 54 can be held. In the present embodiment, however, the hold mode has not been provided, because the control of the electric motor 20 is likely to be complicated.

The above-described solenoid valves 31 to 36 are electrically connected to the electronic controller 10 which controls the operation of the solenoid valves 31 to 36. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel, while other types of sensor may be used, instead of the above-described sensor. There is also provided a pressure sensor 45 which detects pressure of the brake fluid discharged from the master cylinder 2a, and outputs a signal to the electronic controller 10.

Figure 3:
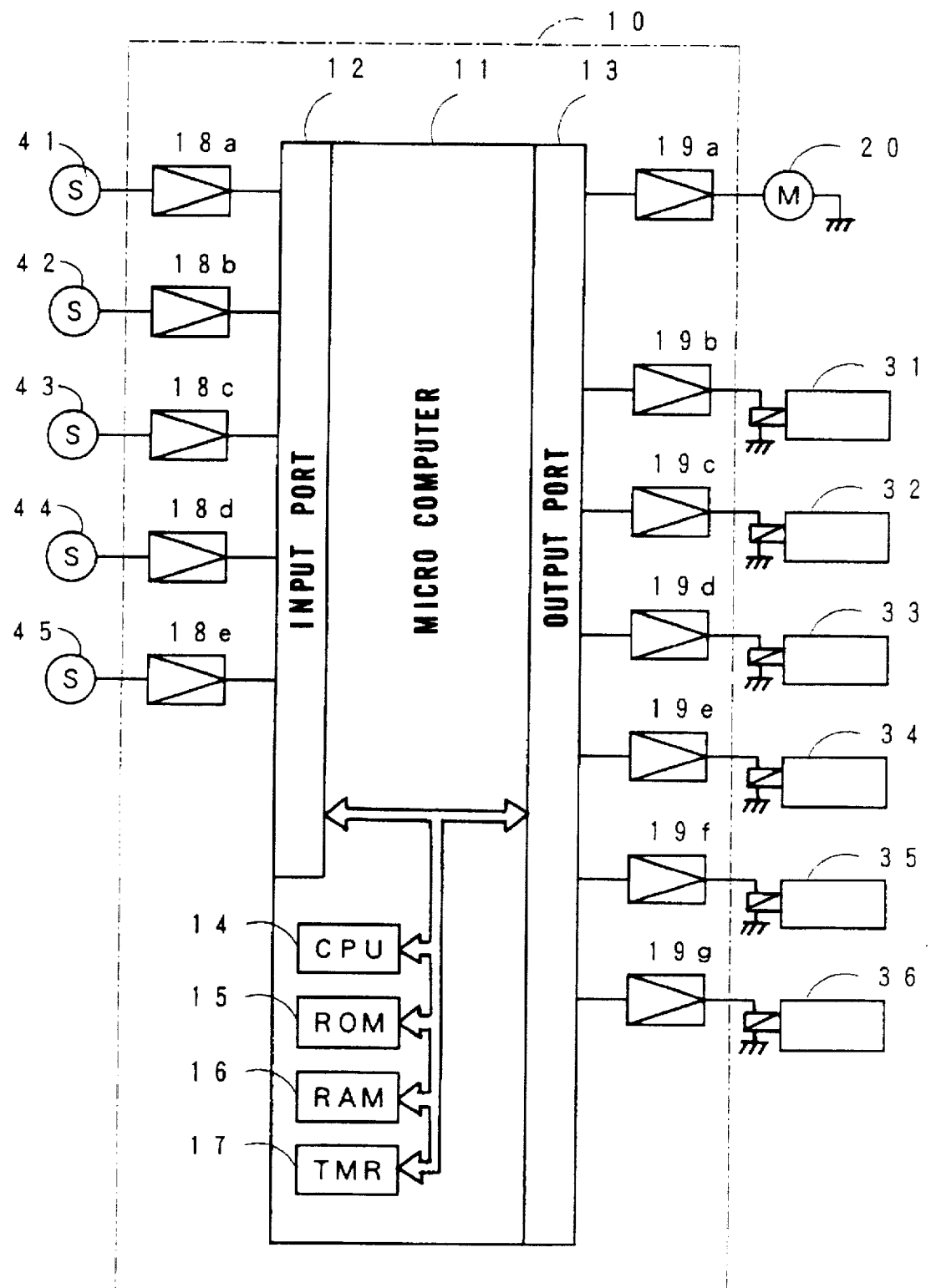
FIG. 3 is a block diagram illustrating the arrangement of an electronic controller as shown in FIG. 2.

As shown in FIG. 3, the electronic controller 10 is provided with a microcomputer 11 having a central processing unit or CPU 14, a read-only memory or ROM 15, a random access memory or RAM 16, a timer 17, which are connected with an input port 12 and an output port 13 via a common bus to execute the input/output operations relative to external circuits. The signals detected by each of the wheel speed sensors 41 to 44 and the pressure sensor 45 are fed to the input port 12 via respective amplification circuits 18a to 18e and then to the CPU 14. Then, a control signal is output from the output port 13 to the electric motor 20 via a drive circuit 19a, and control signals are fed to the solenoid valves 31 to 36 via the respective drive circuits 19b to 19g. In the microcomputer 11, the ROM 15 memorizes a program corresponding to flowcharts shown in FIGS. 4 and 5, the CPU 14 executes the program while the ignition switch (not shown) is closed, and the RAM 16 temporarily memorizes variable data necessary for executing the program.

Figure 4:
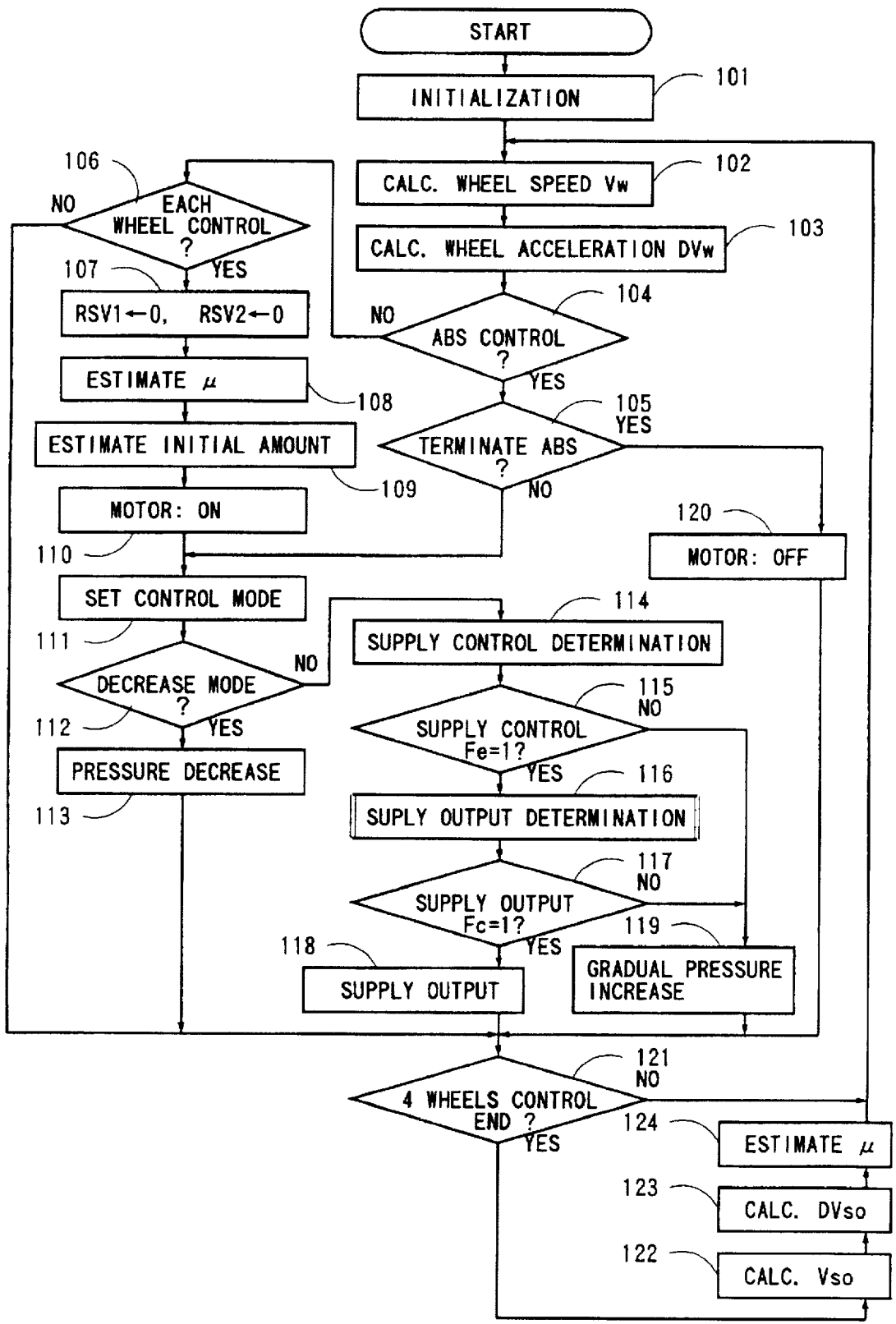
FIG. 4 is a flowchart showing a main routine of the anti-skid control according to the above embodiment of the present invention.
Figure 5:
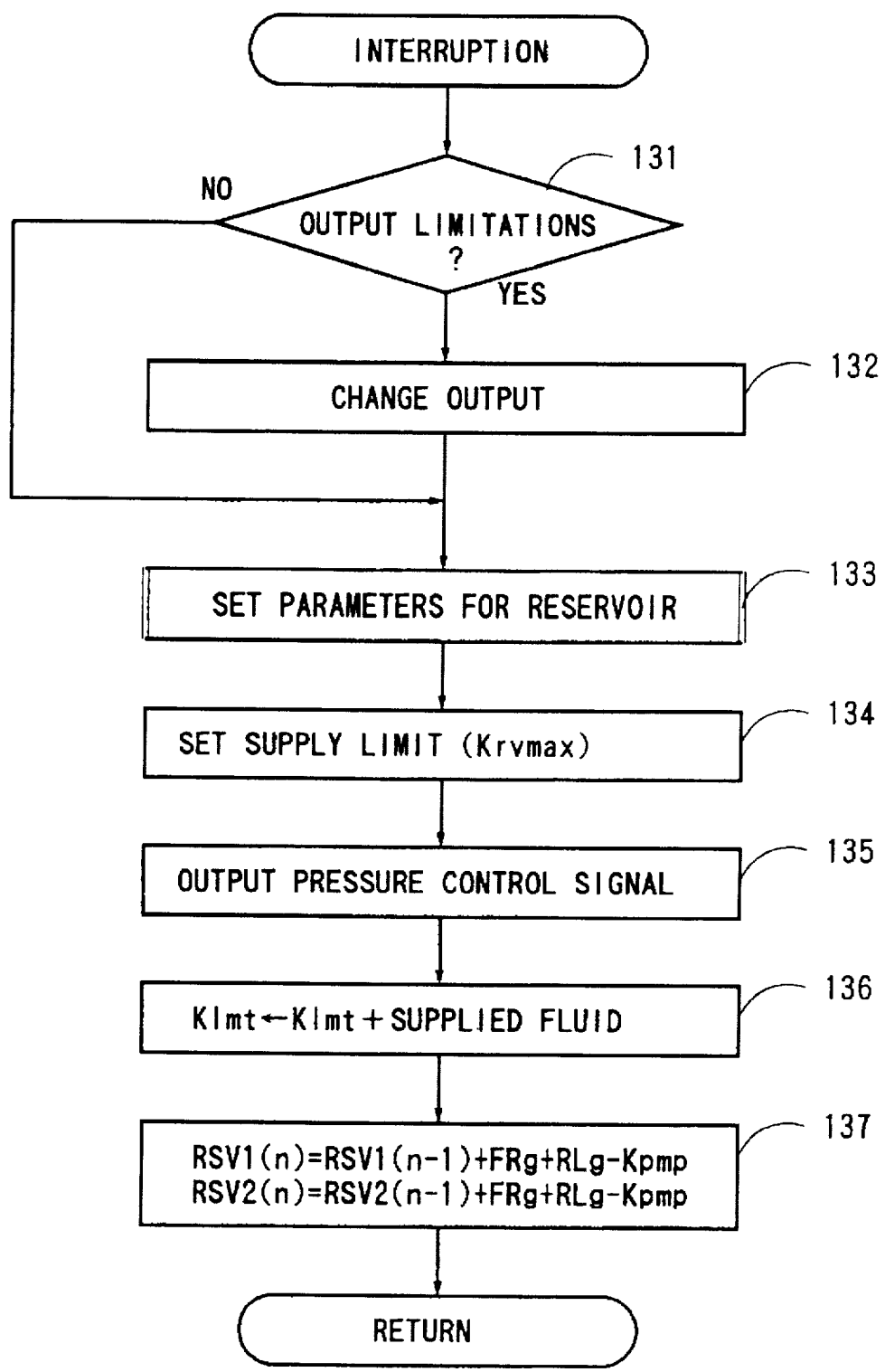
FIG. 5 is a flowchart showing an interruption routine of the anti-skid control according to the above embodiment of the present invention.

A program routine executed by the electronic controller 10 for the anti-skid control will now be described with reference to FIGS. 4 to 8. The program includes a main routine as shown in FIG. 4 and an interruption routine as shown in FIG. 5. The program routine starts when an ignition switch (not shown) is turned on, and the program of the main routine is executed every 6 milliseconds, for example. At the outset, the program as shown in FIG. 4 provides for initialization of the system at Step 101 to clear various data such as an estimated vehicle speed Vso, a wheel speed Vw, a wheel acceleration DVw or the like. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, it is determined whether each of the road wheels is under the anti-skid control (ABS), or not. If it is determined that the anti-skid control is being made, the program proceeds to Step 105, where it is determined whether the conditions for terminating the anti-skid operation have been fulfilled or not. If it is determined at Step 105 that the terminating conditions have been fulfilled, the program proceeds to Step 120, where the motor 20 is turned off, and then jumps to Step 121. If the terminating conditions have not been fulfilled, the program proceeds to Step 111. If it is determined at Step 104 that the anti-skid control operation has not been made (i.e. before the ABS control), it is further determined at Step 106 whether the conditions for initiating the anti-skid control have been fulfilled or not.

Figure 9:
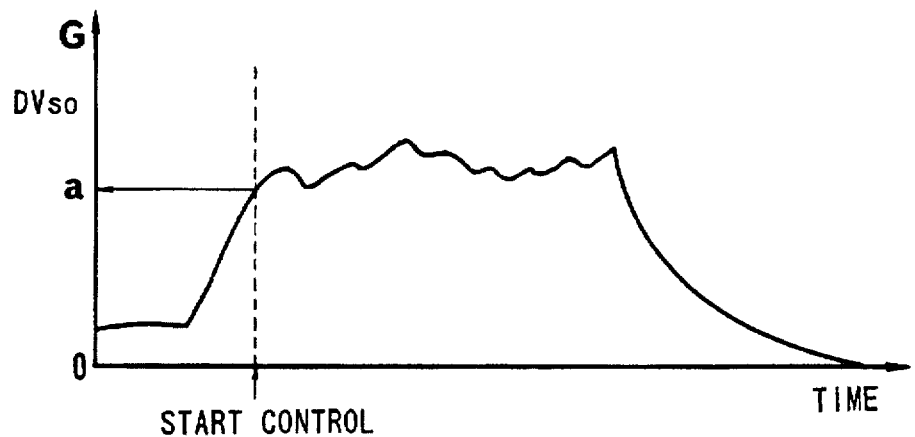
FIG. 9 is a diagram showing an estimated vehicle deceleration when the anti-skid control operation is initiated according to the above embodiment.
Figure 10:
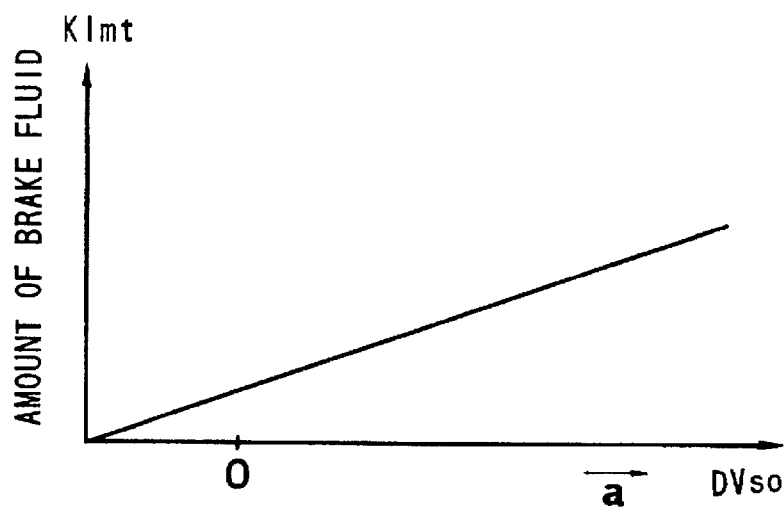
FIG. 10 is a diagram showing the relationship between the estimated vehicle deceleration and the amount of brake fluid supplied into a hydraulic circuit downstream of an actuator including wheel brake cylinders and a reservoir according to the above embodiment.

If it is determined that the conditions for initiating the anti-skid control have not been fulfilled, the program jumps to Step 121, otherwise the program proceeds to Step 107, where an estimated amount of brake fluid RSV1 of the brake fluid stored in the reservoir 23 (i.e., a reservoir fluid amount for the FR-RL system), and an estimated amount of brake fluid RSV2 of the brake fluid stored in the reservoir 24 (i.e., a reservoir fluid amount for the FL-RR system) are cleared, respectively. Then, the program proceeds to Step 108, where a coefficient of friction ($\mu$) of a road surface on which the vehicle is running when the anti-skid control starts is estimated on the basis of an estimated vehicle deceleration DVso which is calculated at Step 123 and which will be described later. Then, at Step 109, a wheel pressure of a wheel which is locked when the ABS control starts is estimated on the basis of the estimated vehicle deceleration DVso, to provide an initial value of an estimated amount of brake fluid (Klmt) which is initially supplied into a hydraulic circuit disposed downstream of each of the solenoid valves 35, 36 and including the wheel brake cylinders 51–54 and the reservoirs 23, 24 (hereinafter, simply referred to as a downstream circuit, respectively), is provided on the basis of the estimated vehicle deceleration DVso, and in accordance with FIGS. 9 and 10. Then, the motor 20 is activated at Step 110. According to the present embodiment, the motor 20 starts rotating at the same time as the anti-skid control starts, and keeps rotating until the anti-skid control will end. At Step 111, either a pressure decrease mode or a gradual pressure increase mode is set in accordance with the braking conditions, the coefficient of friction of the road surface, or the like.

The program further proceeds to Step 112, where it is determined whether the pressure decrease mode is to be selected as the control mode. If it is determined that the pressure decrease mode is to be selected, the program proceeds to Step 113, where the pressure decrease mode is set, and the program proceeds to Step 121. If it is determined that the pressure decrease mode is not to be selected, the program proceeds to Step 114, where the fluid supply control determination is made as described later with reference to FIG. 8. Then, it is determined at Step 115 whether a fluid supply allowing flag (Fe) has been set (1) or not. If the result is affirmative, the program proceeds to Step 116, where a fluid supply output determination is made as described later with reference to FIG. 6, otherwise the program proceeds to Step 119. At Step 117, it is determined whether a fluid supply output requiring flag (Fc) has been set or not. If it is determined that the output requiring flag (Fc) has been set, the program proceeds to Step 118, otherwise it proceeds to Step 119 where the gradual pressure increase mode is set, and it further proceeds to Step 121. At Step 118, a fluid supply output is set, as will be described later.

The program further proceeds to Step 121, where it is determined if the Steps 102–120 have been executed with respect to all of the four road wheels FR, FL, RR, RL. If those steps for all of the road wheels have been executed, the program proceeds to Step 122, otherwise it returns to Step 102 to repeat the above-described routine for the rest of the wheels. At Step 122, the estimated vehicle speed Vso is calculated, and then this estimated vehicle speed Vso is differentiated to provide an estimated deceleration DVso at Step 123. Then, the program proceeds to the next Step 124 where the coefficient of friction of the road surface is estimated, and it returns to Step 102 to repeat the above-described operation.

FIG. 5 is a flowchart of the interruption routine which is executed every 1 millisecond, for example, and wherein it is determined at Step 131 whether any output limitations have been applied or not. If no limitation is applied, the program proceeds to Step 133 where parameters for estimating the amount of brake fluid in the reservoir are provided according to the coefficient of friction of the road surface. If it is determined that any one of the the limitations is applied, the program proceeds to Step 132 before it proceeds to Step 133. According to the present embodiment, in the case where the pressure decrease mode is provided for one of the wheel brake cylinders 51, 54 (52, 53), the gradual pressure increase mode can be provided for the other one of the wheel brake cylinders, but a rapid increase mode can not be provided by connecting the wheel brake cylinders to the master cylinder 2a. Therefore, in the case where the pressure decrease mode is provided for one of the wheel brake cylinders, and neither the pressure decrease mode nor the gradual pressure increase mode is provided for the other one of the wheel brake cylinders, the program proceeds to Step 132, where the output for the other one of the wheel brake cylinders is changed to the gradual pressure increase mode, and the program proceeds to Step 133.

Figure 11:
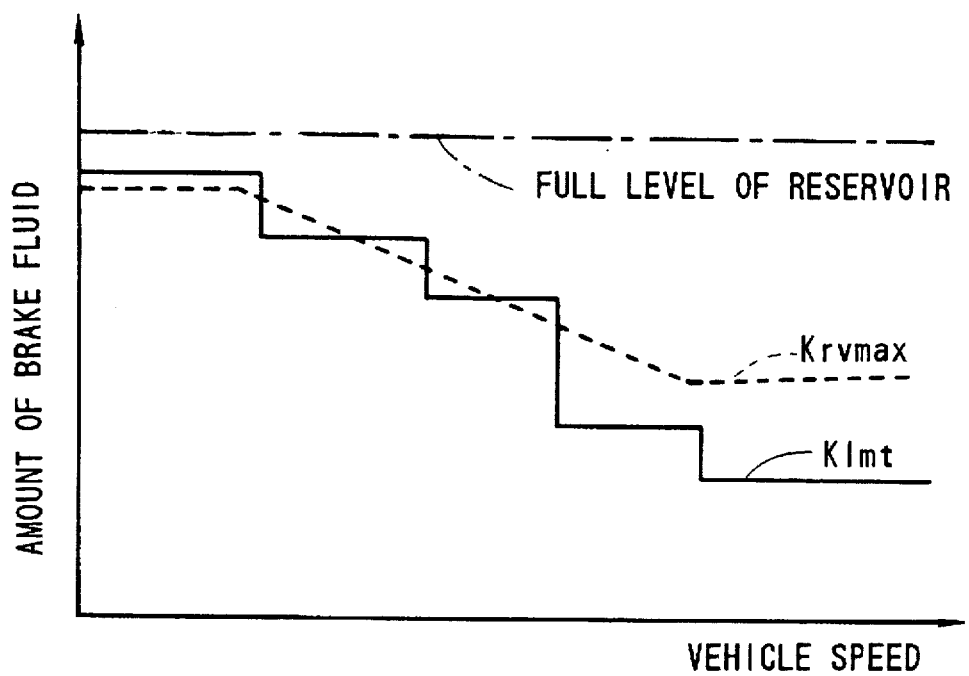
FIG. 11 is a diagram showing the relationship between a vehicle speed and the amount of brake fluid in a reservoir according to the above embodiment.

At Step 134, a fluid supply limit value (Krvmax) is set for providing a limit of the amount of the brake fluid to be supplied from the master cylinder 2a into the wheel brake cylinders in response to the fluid supply operation, so as to avoid the amount of brake fluid in the reservoir 23 or 24 to reach its full level. The limit value (Krvmax) is set so as to be varied in accordance with the vehicle speed as shown in FIG. 11. With the limit value (Krvmax) set as described above, the fluid supply operation may be made irrespective of the vehicle speed. In other words, such a case may be avoided that the number of the fluid supply operations are increased to such an extent that the amount of brake fluid in the reservoir 23 or 24 reaches its full level, so that the fluid supply operation can not be made even at a lower vehicle speed.

Consequently, at Step 135, the pressure control signals as described above are output to perform the braking pressure control. That is, when the pressure decrease signal is output, the electric current is fed to the solenoid of the solenoid valve 35 for the wheel to be controlled (e.g., road wheel FR), so that the pressure in the wheel brake cylinder 51 to be controlled is decreased, with the brake fluid in the wheel brake cylinder 51 received in the reservoir 23 through the de-energized solenoid valve 31. When the gradual pressure increase signal is output, the electric current is fed to the solenoid coils of the solenoid valves 35 and 31 for the wheel to be controlled (e.g., road wheel FR), the brake fluid in the reservoir 23 is supplied to the wheel brake cylinder 51 through the check valve 61 and orifice 81 thereby to gradually increase the pressure in the wheel brake cylinder 51. In the case where the fluid supply control is executed, the solenoid valves 35 and 31 for the wheel to be controlled are de-energized, so that the brake fluid discharged from the master cylinder 2a is directly supplied to the wheel brake cylinder 51 for the wheel to be controlled, thereby to apply the pressure to the wheel brake cylinder 51. In case of the normal braking operation without those output signals provided, no electric current is fed to the solenoid coils of the solenoid valves 35 and 31 for the wheel to be controlled, the pressure in the wheel brake cylinder 51 is increased by the braking pressure discharged from the master cylinder 2a.

The program further proceeds to Step 136 where the estimated amount of brake fluid (Klmt) initially supplied into the downstream circuit is modified by adding thereto the amount of brake fluid supplied from the pressure generator PG to the wheel brake cylinders. Then, at Step 137, the estimated amount of brake fluid in each of the reservoirs 23, 24 is calculated by the following formulations:

$$RSV1(n)=RSV1(n-1)+FRg+RLg-Kpmp, \text{ and}$$

$$RSV2(n)=RSV2(n-1)+FRg+RLg-Kpmp$$

where "RSV1" is the estimated amount of brake fluid in the reservoir 23 for the circuit system FR-RL, "RSV2" is the estimated amount of brake fluid in the reservoir 24 for the circuit system FL-RR, "FRg" and "RLg" are the amount of brake fluid stored per unit time, i.e., millisecond when the pressures in the front wheel cylinders and rear wheel cylinders are decreased, respectively, and "Kpmp" is the amount of brake fluid discharged by the pump per millisecond. "n" indicates the present cycle and "n−1" indicates the previous cycle.

Figure 6:
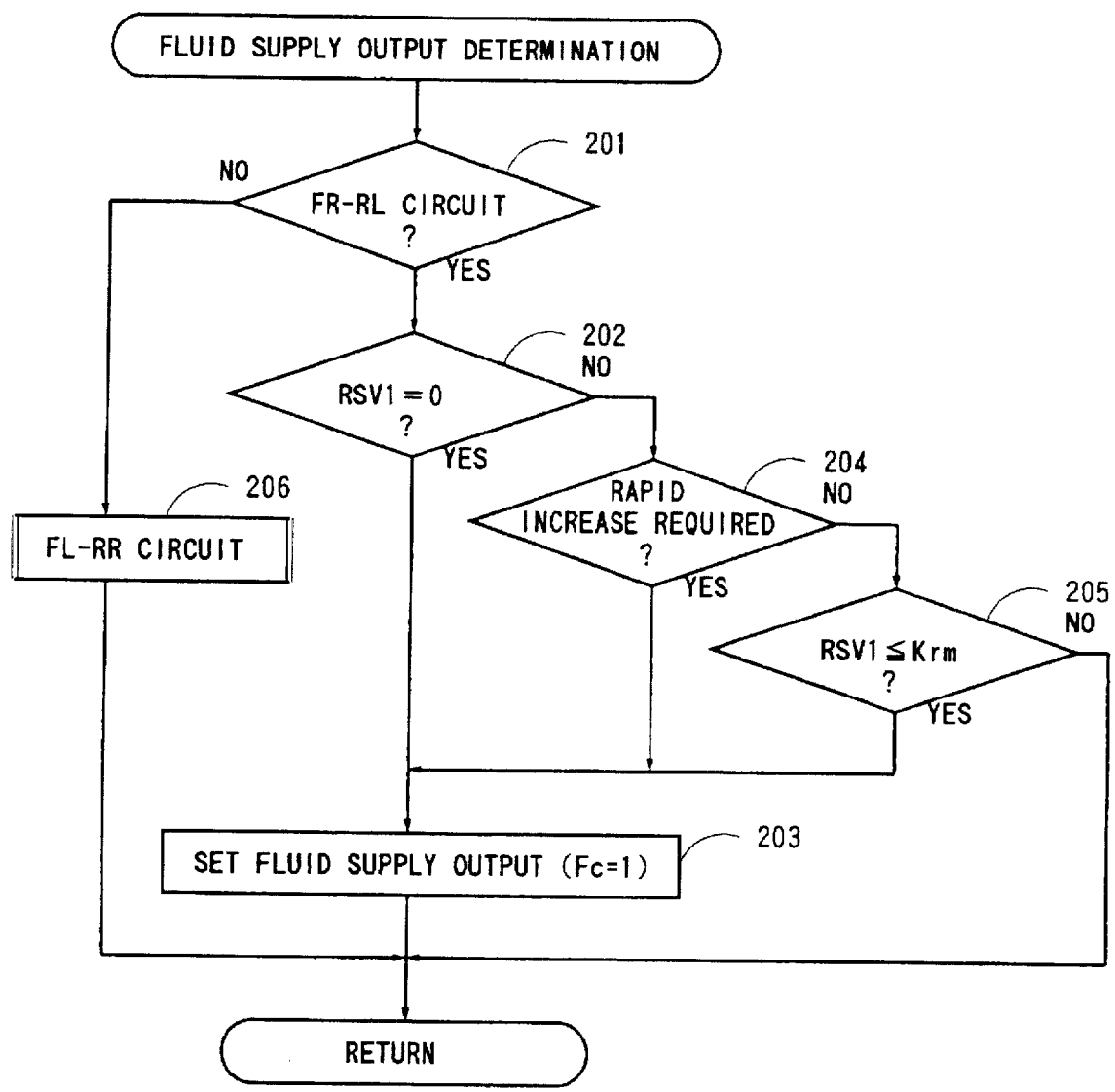
FIG. 6 is a flowchart showing a fluid supply output determination according to the above embodiment of the present invention.

FIG. 6 illustrates a flowchart of a subroutine for the fluid supply output determination executed at Step 116 in FIG. 4, with respect to a circuit including the front right wheel FR and rear left wheel RL (hereinafter referred to as FR-RL circuit) as shown at the left side in FIG. 2. When this program starts, it is determined at Step 201 whether the FR-RL circuit is to be controlled or not. If the FR-RL circuit is not to be controlled, the program proceeds to Step 206 where the circuit of the road wheels FL, RR (FL-RR circuit) is controlled in a similar manner to the FR-RL circuit as described hereinafter. If it is determined at Step 201 that the FR-RL circuit is to be controlled, then the program proceeds to Step 202 where it is determined if the estimated amount of brake fluid (RSV1) supplied into the downstream circuit is zero or not. If the estimated amount of brake fluid (RSV1) is zero, i.e., the reservoir 23 is empty, it is determined at Step 203 that the brake fluid is to be supplied from the master cylinder 2a into the wheel brake cylinders, so that a fluid supply requirement flag (Fc) is set (1). If the brake fluid remains in the reservoir 23, the program proceeds to Step 204, where it is determined whether there is a requirement for supplying the brake fluid from the master cylinder 2a into the wheel brake cylinders thereby to increase the hydraulic pressure therein rapidly, or not, even if the estimated amount of brake fluid (RSV1) is not zero. If that requirement already exists, the program proceeds to Step 203 to set the fluid supply output flag (Fc), and it returns to the main routine in FIG. 4. Otherwise, it further proceeds to Step 205 where the estimated amount of brake fluid (RSV1) is compared with a predetermined value (Krm). If it is determined that the estimated amount of brake fluid (RSV1) is equal to or smaller than the predetermined value (Krm), the program proceeds to Step 203, whereas, if the former is greater than the latter, the program returns to the main routine.

Figure 7:
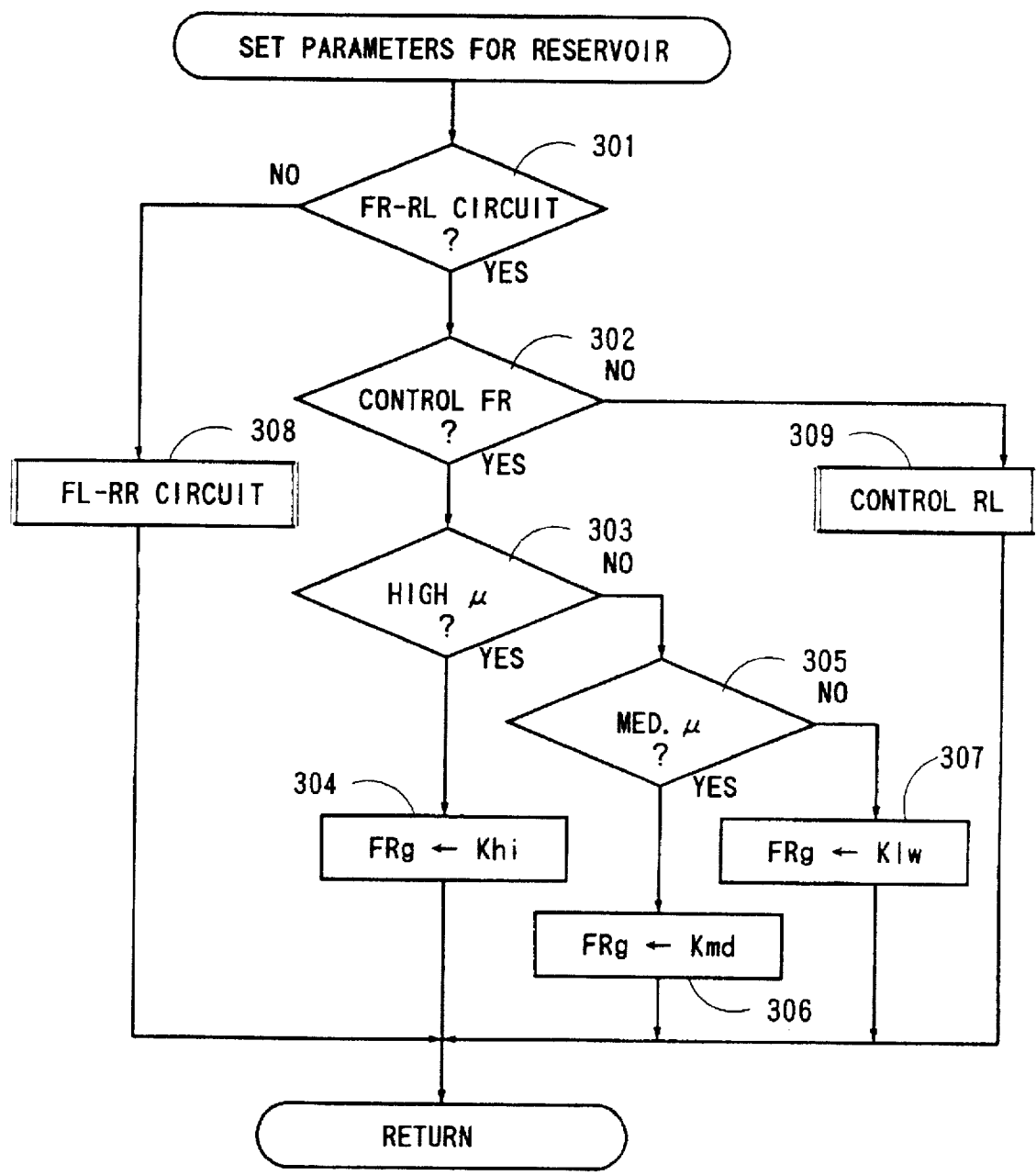
FIG. 7 is a flowchart showing a determination of parameters for estimating the amount of brake fluid in a reservoir according to the above embodiment.

The parameters for estimating the amount of brake fluid in the reservoir to be provided at Step 133 are set according to a flowchart as shown in FIG. 7. At the outset, it is determined at Step 301 whether the FR-RL circuit is to be controlled or not. If the FR-RL circuit is not to be controlled, the program proceeds to Step 308 where the circuit of the road wheels FL, RR (FL-RR circuit) is controlled in a similar manner to the FR-RL circuit. If it is determined at Step 301 that the FR-RL circuit is to be controlled, then the program proceeds to Step 302, where it is further determined if the road wheel FR is to be controlled or not. With respect to either of the road wheels FR or RL, the following Steps are performed. That is, it is determined at Step 303 where the coefficient of friction of the road surface is high (indicated as High$\mu$ in FIG. 7) or not. If the result is affirmative, a value "Khi" is set for the amount of brake fluid stored per unit time, i.e., millisecond (FRg), whereas, if the result is negative, the program proceeds to Step 305. It is determined at Step 305 whether the coefficient of friction of the road surface is intermediate (indicated as Mid.μ in FIG. 7) or not. If the result is affirmative, a value "Kmd" is set for the amount of brake fluid (FRg) stored per millisecond, whereas if the result is negative, a value "Klw" is set for the amount of brake fluid (FRg) stored per millisecond. Then, the program returns to the interruption routine as shown in FIG. 5, with one of the parameters Khi, Kmd, Klw is set for the amount of brake fluid (FRg). Similarly, one of the parameters Khi, Kmd, Klw set for the amount of brake fluid (RLg) stored per millisecond with respect to the road wheel RL at Step 309.

Figure 8:
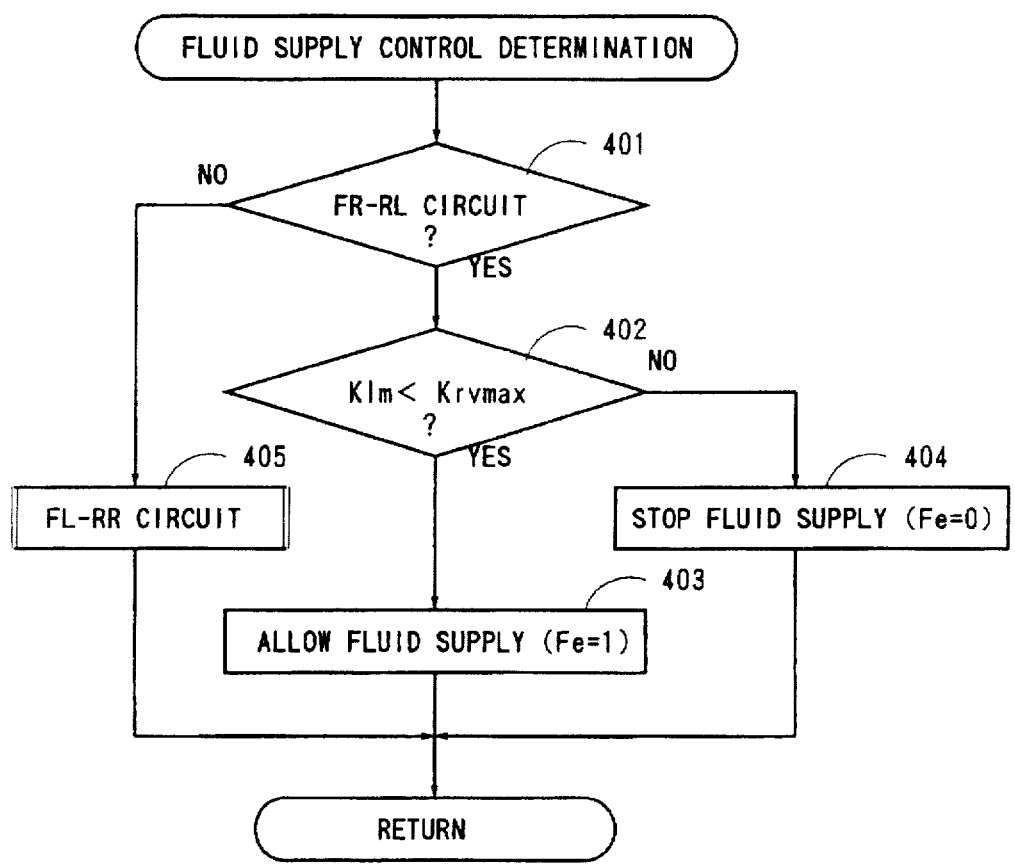
FIG. 8 is a flowchart showing a fluid supply control determination according to above embodiment of the present invention.

FIG. 8 illustrates a flowchart of a subroutine for the fluid supply control determination executed at Step 114 in FIG. 4. At Step 401, it is determined whether the FR-RL circuit is to be controlled or not. If the FR-RL circuit is not to be controlled, the program proceeds to Step 405 where the FL-RR circuit is controlled in a similar manner to the FR-RL circuit. If it is determined at Step 401 that the FR-RL circuit is to be controlled, then the program proceeds to Step 402 where it is determined if the estimated amount of brake fluid (Klmt) supplied into the downstream circuit is smaller than a limit value (Krvmax). If it is determined that the estimated amount of brake fluid (Klmt) is smaller than the limit value (Krvmax), then it is determined that there is a room in the reservoir 23, so that the fluid supply allowing flag (Fe) is set (1). If it is determined at Step 403 that the estimated amount of brake fluid (Klmt) is equal to or greater than the limit value (Krvmax), it means that there is not remained enough room in the reservoir 23, so that the fluid supply allowing flag (Fe) is reset (0) at Step 404. Thus, the fluid supply control is made provided that there remains a room in the reservoir 23 or 24 to prevent an excessive amount of brake fluid from being supplied into the wheel cylinders and filling up the reservoir 23 or 24.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle, comprising:

a wheel brake cylinder operatively connected to a road wheel of said vehicle for applying a braking force thereto;

a hydraulic pressure generator for supplying a pressurized brake fluid to said wheel brake cylinder;

actuating means disposed between said hydraulic pressure generator and said wheel brake cylinder for controlling the hydraulic braking pressure in said wheel brake cylinder;

a reservoir communicated with said actuating means, said reservoir having a capacity for storing a certain amount of brake fluid, and said reservoir storing the brake fluid in said wheel brake cylinder through said actuating means to decrease the pressure in said wheel brake cylinder;

a return passage for communicating said reservoir with said wheel brake cylinder;

a pressure pump disposed in said return passage, said pressure pump having an inlet port communicated with said reservoir and an outlet port communicated with said wheel brake cylinder for discharging a pressurized brake fluid thereinto, said actuating means blocking the communication between said hydraulic pressure generator and said wheel brake cylinder, and then said pressure pump discharging the brake fluid stored in said reservoir into said return passage to gradually increase the pressure in said wheel brake cylinder;

first fluid estimating means for estimating a first amount of brake fluid supplied from said hydraulic pressure generator into a hydraulic circuit disposed downstream of said actuating means and including said wheel brake cylinder and said reservoir; and fluid supply allowing means for allowing said actuating means to communicate said hydraulic pressure generator with said wheel brake cylinder, when the first amount of brake fluid is smaller than a first predetermined amount.

2. The anti-skid control system as claimed in claim 1, further comprising vehicle deceleration detecting means for detecting a deceleration of said vehicle, said first fluid estimating means estimating the first amount of brake fluid on the basis of the deceleration of said vehicle detected by said vehicle deceleration detecting means when said actuating means starts controlling the hydraulic braking pressure in said wheel brake cylinder, and adding to the first amount of brake fluid a supply amount of brake fluid supplied into said wheel brake cylinder by said actuating means.

3. The anti-skid control system as claimed in claim 2, further comprising wheel speed sensors for detecting wheel speeds of said road wheels, and vehicle speed estimating means for estimating an estimated vehicle speed on the basis of the wheel speeds of said road wheels, said vehicle deceleration detection means differentiating the estimated vehicle speed to provide the vehicle deceleration.

4. The anti-skid control system as claimed in claim 3, wherein the first predetermined amount is set in response to the vehicle speed estimated by said vehicle speed estimating means, the first predetermined amount being set to be relatively small when the vehicle speed estimated by said vehicle speed estimating means is relatively high, and the first predetermined amount being set to be relatively large when the vehicle speed is relatively low.

5. The anti-skid control system as claimed in claim 1, further comprising a pressure sensor for detecting pressure in said wheel brake cylinder, said first fluid estimating means estimating the first amount of brake fluid on the basis of the pressure in said wheel brake cylinder detected by said pressure sensor when said actuating means starts controlling the hydraulic braking pressure in said wheel brake cylinder, and adding to the first amount of brake fluid a supply amount of brake fluid supplied into said wheel brake cylinder by said actuating means.

6. The anti-skid control system as claimed in claim 1, wherein said fluid supply allowing means is adapted to allow said actuating means to communicate said hydraulic pressure generator with said wheel brake cylinder, when a rapid increase of the hydraulic braking pressure in said wheel brake cylinder is required.

7. The anti-skid control system as claimed in claim 1, further comprising second fluid estimating means for estimating a second amount of brake fluid stored in said reservoir on the basis of the amount of brake fluid supplied into said reservoir and the amount of brake fluid discharged from said reservoir, said fluid supply allowing means allowing said actuating means to communicate said hydraulic pressure generator with said wheel brake cylinder, when the second amount of brake fluid is smaller than a second predetermined amount.

8. The anti-skid control system as claimed in claim 7, further comprising wheel speed sensors for detecting wheel speeds of said road wheels, and means for estimating a coefficient of friction of a road on the basis of the wheel speeds of said road wheels detected by said wheel speed sensors, the second amount of brake fluid being set to be relatively small when the coefficient of friction is relatively low, and the second amount of brake fluid being set to be relatively large when the coefficient of friction is relatively high.

9. The anti-skid control system as claimed in claim 1, wherein said actuating means includes:

a three-port two-position changeover valve having a first port connected to said hydraulic pressure generator, and a second port connected to an end of said return passage; and a two-port two-position changeover valve having a first port connected to a third port of said three-port two-position changeover valve, and a second port connected to said brake cylinder;

wherein said three-port two-position changeover valve is selectively placed in one of a first operating position for communicating said two-port two-position changeover valve with said hydraulic pressure generator and blocking the communication with said return passage, and a second operating position for communicating said two-port two-position changeover valve with said return passage and blocking the communication with said hydraulic pressure generator, and wherein said two-port two position changeover valve is selectively places in one of a first operating position for communicating said wheel brake cylinder with said three-port two position changeover valve, and a second operating position for blocking the communication between said wheel brake cylinder and said three-port two-position changeover valve.

\* \* \* \* \*